United States Patent [19]
Findikli

[11] Patent Number: 6,044,271
[45] Date of Patent: Mar. 28, 2000

[54] SYSTEM AND METHOD FOR HANDING OFF A CELLULAR CALL WITH SYSTEM AND CAPABILITY CHANGE INDICATION

[75] Inventor: Nadi Sakir Findikli, Cary, N.C.

[73] Assignee: Ericsson Inc., Research Triangle Park, N.C.

[21] Appl. No.: 08/996,751

[22] Filed: Dec. 23, 1997

[51] Int. Cl.[7] ............... H04Q 7/20; H04Q 7/22; H04Q 7/36

[52] U.S. Cl. ............ 455/436; 455/437; 455/438; 455/439; 455/445; 455/414; 455/442; 370/331

[58] Field of Search .................. 455/436, 432, 455/434, 437, 438, 403, 440, 441, 442, 443, 445, 550, 552, 553, 439, 414, 444; 370/331

[56] References Cited

U.S. PATENT DOCUMENTS

| | | | |
|---|---|---|---|
| 5,504,935 | 4/1996 | Vercauteren | 455/445 |
| 5,509,035 | 4/1996 | Teidemann, Jr. et al. | 455/436 |
| 5,640,414 | 6/1997 | Blakeney, II et al. | 455/438 |
| 5,794,149 | 8/1998 | Hoo | 455/436 |
| 5,848,063 | 12/1998 | Weaver, Jr. et al. | 455/436 |
| 5,854,981 | 12/1998 | Wallstedt et al. | 455/443 |
| 5,857,153 | 1/1999 | Lupien | 455/436 |

FOREIGN PATENT DOCUMENTS

| | | |
|---|---|---|
| 0589552A2 | 7/1993 | European Pat. Off. . |
| 0725552A2 | 1/1996 | European Pat. Off. . |
| 96/33589 | 10/1996 | WIPO . |

*Primary Examiner*—Fan S. Tsang
*Assistant Examiner*—Keith Ferguson
*Attorney, Agent, or Firm*—Wood, Phillips, VanSanten, Clark & Mortimer

[57] ABSTRACT

A cellular mobile telecommunication system includes a mobile station communicating with any one of a plurality of geographically spaced base stations, the base stations communicating with a mobile switching center to selectively determine one of the base stations to process a call with the mobile station. A handoff system hands off a cellular call with the mobile station from one base station to another base station. The handoff system includes a forward communication channel selectively associated with the one base station for transferring data from the one base station to the mobile station. The one base station is adapted to receive a command from the mobile switching center to handoff processing of the call to another base station, the command including information on capabilities of another base station. A message generator operatively associated with the one base station sends a capability change indicator to the mobile station via the forward communication channel and responds to a handoff command from the mobile switching center. The capability change indicator includes information on capabilities of the another base station relative to the one base station.

14 Claims, 1 Drawing Sheet

SYSTEM AND METHOD FOR HANDING OFF A CELLULAR CALL WITH SYSTEM AND CAPABILITY CHANGE INDICATION

FIELD OF THE INVENTION

This invention relates to a system and method for handing off a cellular call between base stations and, more particularly, to addition of system and capability change indication to handoffs.

A cellular mobile telecommunication system includes a mobile station communicating with any one of a plurality of geographically spaced base stations. Each base station is located in a pre-defined "cell". The base stations communicate with a mobile switching center which selectively determines which of the base stations should process a call with the mobile station based on considerations such as signal strength between each available base station and the mobile station.

As a mobile station moves from one cell to another, the signal strength diminishes. Therefore, the call must be switched from one base station to another base station. This is referred to as a "handoff". The handoff is ideally implemented without interfering with the call in progress.

When a call is handed off, the handoff may be from one cellular system to another cellular system. Use of a different cellular system can result in different handling of the call. Likewise, capabilities vary among different systems. For example, some systems might include features such as voice privacy, message encryption, automatic retransmission for long messages or the like. It can be helpful for the mobile station to be aware that a change in system or capability has occurred. This could be accomplished by the mobile station automatically requesting what features are supported by making a capability update request. Ideally, this would be done before activating some feature which might not be available. However, sending of a capability request can degrade voice quality at handoff, as there is substantial data transferred in a message.

The present invention is directed to overcoming one or more of the problems discussed above in a novel and simple manner.

SUMMARY OF THE INVENTION

In accordance with the invention there is provided a system and method of handing off a cellular call including adding system and capability change indications to handoffs.

Broadly, there is disclosed herein in a cellular mobile telecommunication system including a mobile station communicating with any one of a plurality of geographically spaced base stations, the base stations communicating with a mobile switching center to selectively determine one of the base stations to process a call with the mobile station, a handoff system for handing off a cellular call with the mobile station from one base station to another base station. The handoff system includes a forward communication channel selectively associated with the one base station for transferring data from the one base station to the mobile station. The one base station is adapted to receive a command from the mobile switching center to handoff processing of the call to another base station, the command including information on capabilities of another base station. A message generator operatively associated with the one base station sends a capability change indicator to the mobile station via the forward communication channel and responds to a handoff command from the mobile switching center. The capability change indicator includes information on capabilities of the another base station relative to the one base station.

It is a feature of the invention that the capability change indicator indicates if the another base station is from a same cellular system as the one base station.

It is another feature of the invention that the capability change indicator indicates if the another base station has different capabilities from the one base station.

It is a further feature of the invention that the forward communication channel comprises a forward analog voice channel and the message generator sends the capability change indicator as part of a mobile station control message. The capability change indicator comprises two select bits of the mobile station control message.

It is a further feature of the invention that the forward communication channel comprises a forward digital traffic channel and the message generator sends the capability change indicator as part of a handoff message. In one aspect, the capability change indicator is sent as part of a dedicated digital traffic channel handoff for a message.

In accordance with another aspect of the invention, there is disclosed a method for handing off a cellular call with a mobile station from any one base station to another base station in a cellular mobile communication system including the mobile station communicating with any one of a plurality of geographically spaced base stations each in cell locations. The base stations communicate with a mobile switching center to selectively determine one of the base stations to process a call with the mobile station. The method comprises the steps of the one base station transferring data to the mobile station via a forward communication channel selectively associated with the one base station; the one base station receiving a handoff command from the mobile switching center to handoff processing of the call to another base station, the command including information on capabilities of the another base station; and the one base station generating a message including a capability change indicator to the mobile station via the forward communication channel in response to a handoff command from the mobile switching center, the capability change indicator including information and capabilities of the another base station relative to the one base station.

Further features and advantages of the invention will be readily apparent from the specification and from the drawing.

DETAILED DESCRIPTION OF THE INVENTION

Figure 1:
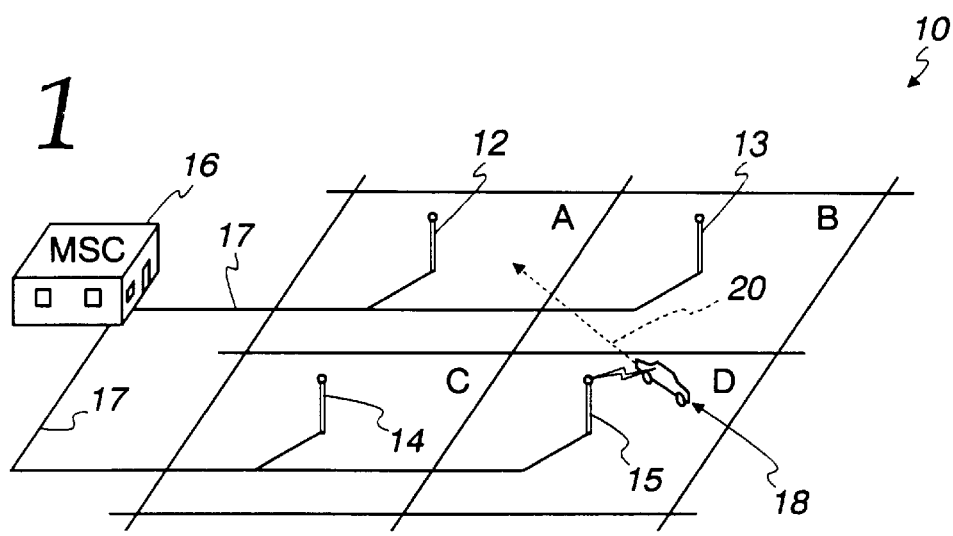
FIG. 1 is a perspective view of a cellular mobile telecommunication system.

Referring initially to FIG. 1, a cellular mobile telecommunication system 10 of conventional construction is illustrated. As is well known, the cellular system 10 is defined by plural cells, including representative cell locations A, B, C and D. Each cell A–D includes a respective base station 12, 13, 14 and 15. Each of the base stations 12–15 communicates with a mobile switching center 16 via intercellular trunks 17. A mobile station, represented at 18, may consist of, for example, a cellular phone carried by a user in an automobile. However, as is apparent, the mobile station may comprise any known form of mobile station capable of communicating within a cellular mobile telecommunication system 10.

The telecommunication system 10 is operable to select from one of the base stations 12–15 to process a call with the mobile station 18. As illustrated, the mobile station 18 is located in cell location D. Consequently, the call in progress would be handled by the base station 15. If the mobile station 18 is stationary, then the call would likely be handled until completion by the base station 15. However, if the mobile station is moving, then it could cross into different cells. For example, as illustrated, the mobile station 18 might be moving in a direction as indicated by the dashed line 20 and traverse into cell location B and subsequently cell location A. A typical cellular mobile telecommunication system 10 utilizes handoffs to hand a call off from the base system 15 to the base station 13, and subsequently from the base station 13 to the base station 12, as the mobile station traverses from cell location D to respective cell locations B and A.

The cellular telecommunication system 10 does not itself form part of the invention. Instead, the invention relates to adding system and capability change indication to handoffs.

Presently, standard IS 136.2 forms a compatibility standard for cellular mobile telecommunication systems. This standard ensures that a mobile station can obtain service in any cellular system manufactured according to that standard. The standard for IS 136.2 is incorporated by reference herein.

In the illustration of FIG. 1, a handoff typically occurs as the mobile station 18 crosses from the cell location D to the cell location B. However, the handoff does not necessarily occur strictly as a boundary is crossed. Instead, the one base station 15 senses that there is a deterioration of the signal with the mobile station 18. As a result, the one base station 15 sends a handoff request to the mobile switching center 16. Not knowing which direction the mobile station 18 is moving, the mobile switching center 16 sends handoff measurement requests to the adjacent base stations, such as the base stations 12, 13 and 14. Each of these base stations 12–14 communications with the mobile station 18. The base stations 12–14 send measurement responses to the mobile switching center 16. The mobile switching center 16 then sends a channel assignment to the one base station 15 containing information on another one of the base stations 12–14 to which the call will be handed off. The one base station 15 then transmits the handoff order to the mobile station 18 over a forward communication channel. As a result, the mobile station reprograms itself to subsequently communicate with the other base station, such as the base station 13.

Present cellular systems 10 include analog systems and digital systems. With an analog system, during a call in progress the mobile station 18 communicates with the particular base station, such as the base station 15, via an analog voice channel. As is well known, the forward analog channel sends a data stream from the base station 15 to the mobile station 18. A reverse analog voice channel sends a data stream from the mobile station 18 to the base station 15. A mobile station control message is the only message transmitted over the forward voice channel. The mobile station control message, as described in IS 136.2, section 3.7.2.1, consists of one or more words defining communications. The mobile station control message is periodically sent to the mobile station and includes information on handling of the call, including for handoffs.

Digital cellular systems utilize reverse and forward digital traffic channels (DTCs) for transporting user information and signalling between a base station and a mobile station. As described in IS 136.2, the forward digital traffic channel has associated two separate control channels, namely, a fast associated control channel (FACCH) and a slow associated control channel (SACCH).

In a digital system there are two types of handoffs. A normal handoff or a dedicated handoff. With a normal handoff, a handoff message is sent from the base station to the mobile station via the FACCH channel. For a dedicated digital traffic channel handoff, a distinct message is sent from the base station to the mobile station to order the mobile station from one digital traffic channel to another digital traffic channel.

As described in IS-136.2, when a mobile station is on a digital traffic channel, it makes assumptions as to the capability of the system the DTC belongs to. The basis for these assumptions in part is present in the control channel that the mobile station was camping on before being assigned to the DTC. However, when the mobile station is handed off to another DTC, it is not always clear if the new DTC belongs to the same system as the old DTC. This makes it difficult to estimate the capability of the new channel. Similarly, the mobile station desirably has knowledge of whether the channel being handed off to has the same capabilities as the channel it is leaving. This information can be used in performing more efficient scanning when the call is ended, for example.

In accordance with the invention, the handoff procedures under IS-136.2 are modified to allow the mobile station to be informed if the new channel belongs to the same system and/or has the same capabilities as the old channel.

If the mobile station does not know the capabilities of the new system, it might attempt to perform certain functions resulting in no response from the system, which causes the user interface of the mobile station to act erratically, or results in miscommunication between the mobile station and the system, causing the call to be degraded or dropped. While the mobile station could request system capability after every handoff, voice quality would be degraded at every handoff.

Thus, in accordance with the invention a system and method is contemplated for informing the mobile station directly during handoff of any changes to the system and/or capabilities in the new channel. The system and method adds any necessary messages and procedures that enable a cellular system to inform a mobile station, during a handoff, of any changes to the system to which the new channel is connected and the capability of the new channel, both with respect to the current channel which is the one on which the handoff message was received.

In accordance with the invention, a two bit field called capability change indicator (CCI) is defined and carries information for any changes. The two bit field is used to specify the new channel at handoff as follows:

| Description | Code |
|---|---|
| Same System, Same Capabilities | 00 |
| Same System, Different Capabilities | 01 |
| Different System, Same Capabilities | 10 |
| Different System, Different Capabilities | 11 |

Figure 2:
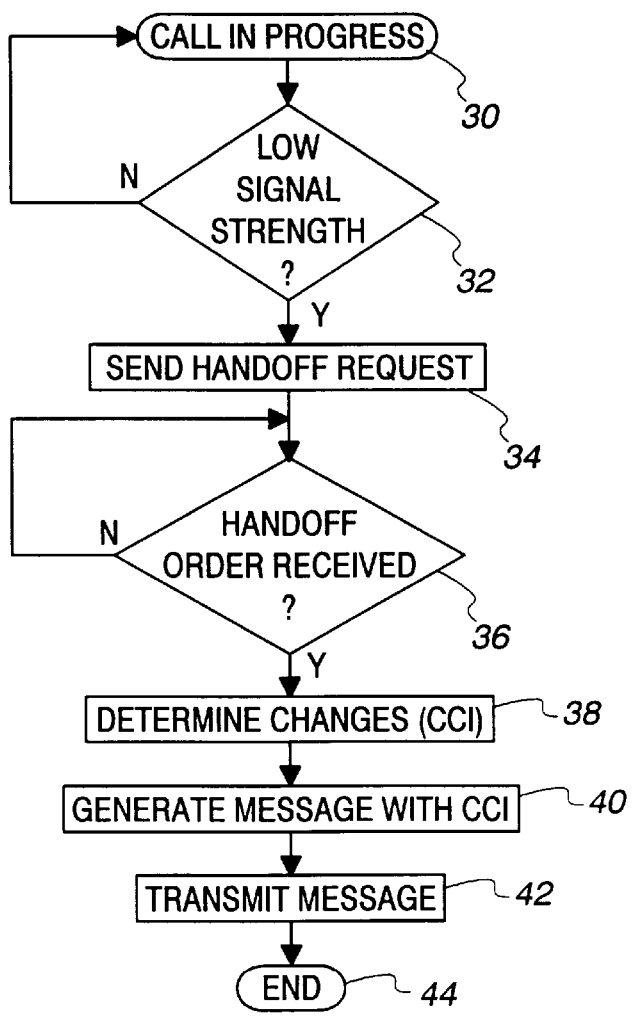
FIG. 2 is a flow diagram of a method and system for handing off a cellular call according to the invention.

Referring to FIG. 2, a flow diagram illustrates how the CCI is transferred from a current base station to the mobile station.

As is apparent, a handoff would occur during a call in progress, as represented by the circle 30 in FIG. 2. Referring to the illustrated example, the call in progress with the mobile station 18 is processed by the one base station 15. A decision block 32 periodically determines if the signal strength from the mobile station 18 is low. If not, then handling of the call continues until completed. If the decision block 32 determines that the signal strength is low so that the further handling of the call might be degraded, then a handoff request is sent at a block 34 to the mobile switching center 16. The mobile switching center then determines if another base station should be selected for further handling of the call. A decision block 36 then recycles on itself until a handoff order is received from the mobile switching center 16. Once a handoff order is received, then a block 38 determines, based on information in the handoff order, if the channel to which the call will be handed off is in the same system or a different system and has the same capabilities or different capabilities. The CCI is then generated. A block 40 then generates the appropriate message for the type of call based on the type of channel the call is presently being handled on. The handoff message is then transmitted at a block 42. As a result, the mobile station will switch over to the new channel and processing with the one base station will end at a block 44.

As is conventional, there are five types of handoffs that might occur. The handoff can be from an analog voice channel (AVC) to another AVC or to a digital traffic channel (DTC). Alternatively, the handoff can be from a DTC to an AVC or another DTC. If the call is from one DTC to another DTC, then it can be a normal handoff or a dedicated handoff.

As described above, the forward analog voice channel (FVC) transmits a mobile station control message as described in IS-136.2. The mobile station control message consists of one or more words. The first word defines various information elements and length in bits. The mobile station control message Word 1 includes several reserved bits. In accordance with the invention, the mobile station control message Word 1 is modified so that two of the reserved bits are replaced with the CCI and a previously used PSCC data field in Word 2 is replaced with the CCI, as follows:

| Mobile Station Control Message Word 1 | | | |
|---|---|---|---|
| Information Element | Length (bits) | | |
| $T_1 T_2 = 10$ | 2 | | |
| SCC | 2 | | |
| SCC = 11 | | SCC ≠ 11 | |
| Information Element | Length (bits) | Information Element | Length (bits) |
| PSCC | 2 | PSCC | 2 |
| EF (= 0) | 1 | EF (= 0) | 1 |
| RSVD = 00000000/ DVCC | 8 | RSVD = 0..0 | 2 |
| LOCAL/MSG TYPE | 5 | CCI | 2 |
| ORDQ | 3 | DTX | 1 |
| ORDER | 5 | PVf | 1 |
| P | 12 | MEM | 1 |
| | | VMAC | 3 |
| | | CHAN | 11 |
| | | P | 12 |

| Word 2 - Digital Channel Assigmnent | |
|---|---|
| Information Element | Length (bits) |
| $T_1 T_2 = 01$ | 2 |
| MEM | 1 |
| PM | 1 |
| CCI | 2 |
| SBI | 2 |
| TA | 5 |
| DMAC | 4 |
| CHAN | 11 |
| P | 12 |

The interpretation of the data fields, other than the CCI, is as described in IS-136.2, section 3.7.2.1.

As presently implemented, a handoff from a DTC to an AVC or a normal handoff from a DTC to another DTC uses a handoff message as described in IS-136.2, Section 3.7.3.1.3.2.4. This message includes no available space to add the CCI information. While the CCI could possibly be substituted for other of the bits, in accordance with the invention the CCI information is not added in this situation and a mobile station will assume that the new channel belongs to the same system as the old channel and has the same capabilities as the old channel.

Finally, with a dedicated DTC to DTC handoff, this is done with a dedicated digital traffic channel handoff as described in IS-136.2, Section 3.7.3.1.3.2.20, which defines the message format. In accordance with the invention, the CCI is added to the message and parameter-type codes as follows:

| Message Format | | |
|---|---|---|
| Information Element | Type | Length (bits) |
| Protocol Discriminator | M | 2 |
| Message Type | M | 8 |
| RF Channel | M | 11 |
| ATS | M | 4 |
| DVCC | M | 8 |
| DMAC | M | 4 |
| Time Alignment | M | 5 |
| Shortened Burst Indicator | M | 2 |
| PV | M | 4 |
| SOC Change Indicator | M | 1 |
| BSMC Change Indicator | M | 1 |
| DTX Control | M | 1 |
| Remaining Length | M | 6 |
| Delta Time | O | 21 |
| Voice Mode (Note 1) | O | 16 |
| Data Privacy Mode (Note 1) | O | 11 |
| Message Encryption Mode C (Note 1) | O | 19 |
| Target Hyperband (Note 2) | O | 12 |
| Capability Change (CCI) (Note 3) | O | 12 |

Note 1: In the absence of this information element, the mobile station shall assume the feature settings for the current DTC are maintained for the new DTC.
Note 2: In the absence of this informafion element, the mobile station shall assume that the new DTC is in the same Hyperband as the current DTC.
Note 3: In the absence of this information element, the mobile station shall assume that the new DTC belongs to the same system as the current DTC and has the same capabilities as the current DTC.

| Parameter-Type Codes for Optional Information Elements | |
|---|---|
| Parameter Type | Code |
| Delta Time | 0001 |
| Voice Mode | 0010 |
| Data Privacy Mode | 0011 |
| Message Encryption Mode C | 0100 |
| Target Hyperband | 0101 |
| Capability Change | 0110 |

| Field | Length (bits) |
|---|---|
| Parameter Type | 4 |
| Number of Values | 6 |
| Capability Change Indicator | 2 |

As used herein, the term "forward communication channel" is intended to refer to the forward analog voice channel in analog systems and the forward dedicated traffic channel in digital systems.

Thus, in accordance with the invention there is disclosed a system and method for handing off a cellular call adding system and capability change indication to handoffs.

I claim:

1. In a cellular mobile telecommunications system including a mobile station communicating with any one of a plurality of geographically spaced base stations each in cell locations, the base stations communicating with a mobile switching center to selectively determine one of the base stations to process a call with the mobile station, a handoff system for handing off a cellular call with the mobile station from any one base station to another base station, comprising:

a forward communication channel selectively associated with the one base station for transferring data from the one base station to the mobile station;

the one base station being adapted to receive a command from the mobile switching center to handoff processing of the call to another base station, the command including information on capabilities of the another base station; and a message generator operatively associated with the one base station for sending a capability change indicator to the mobile station via the forward communication channel in response to a handoff command from the mobile switching center, the capability change indicator including information on capabilities of the another base station relative to the one base station.

2. The handoff system of claim 1 wherein the capability change indicator indicates if the another base station is from a same cellular system as the one base station.

3. The handoff system of claim 1 wherein the capability change indicator indicates if the another base station has different capabilities form the one base station.

4. The handoff system of claim 1 wherein the forward communication channel comprises a forward digital traffic channel and the message generator sends the capability change indicator as part of a handoff message.

5. The handoff system of claim 1 wherein the forward communication channel comprises a forward digital traffic channel and the message generator sends the capability change indicator as part of a dedicated digital traffic channel handoff for a message.

6. The handoff system of claim 1 wherein the forward communication channel comprises a forward analog voice channel and the message generator sends the capability change indicator as part of a mobile station control message.

7. The handoff system of claim 6 wherein the capability change indicator comprises two select bits of the mobile station control message.

8. A method for handing off a cellular call with a mobile station from any one base station to another base station in a cellular mobile telecommunications system including the mobile station communicating with any one of a plurality of geographically spaced base stations each in cell locations, the base stations communicating with a mobile switching center to selectively determine one of the base stations to process a call with the mobile station, the method comprising the steps of:

the one base station for transferring data to the mobile station via a forward communication channel selectively associated with the one base station;

the one base station receiving a handoff command from the mobile switching center to handoff processing of the call to another base station, the command including information on capabilities of the another base station; and the one base station generating a message including a capability change indicator to the mobile station via the forward communication channel in response to a handoff command from the mobile switching center, the capability change indicator including information on capabilities of the another base station relative to the one base station.

9. The method of claim 8 wherein the capability change indicator indicates if the another base station is from a same cellular system as the one base station.

10. The method of claim 8 wherein the capability change indicator indicates if the another base station has different capabilities form the one base station.

11. The method of claim 8 wherein the forward communication channel comprises a forward digital traffic channel and the generating step sends the capability change indicator as part of a handoff message.

12. The method of claim 8 wherein the forward communication channel comprises a forward digital traffic channel and the generating step sends the capability change indicator as part of a dedicated digital traffic channel handoff for a message.

13. The method of claim 8 wherein the forward communication channel comprises a forward analog voice channel and the generating step sends the capability change indicator as part of a mobile station control message.

14. The method of claim 13 wherein the capability change indicator comprises two select bits of a first word of the mobile station control message.

* * * * *